Feb. 16, 1971  R. G. GREEN  3,562,919
LAYOUT TOOL
Filed Aug. 29, 1968
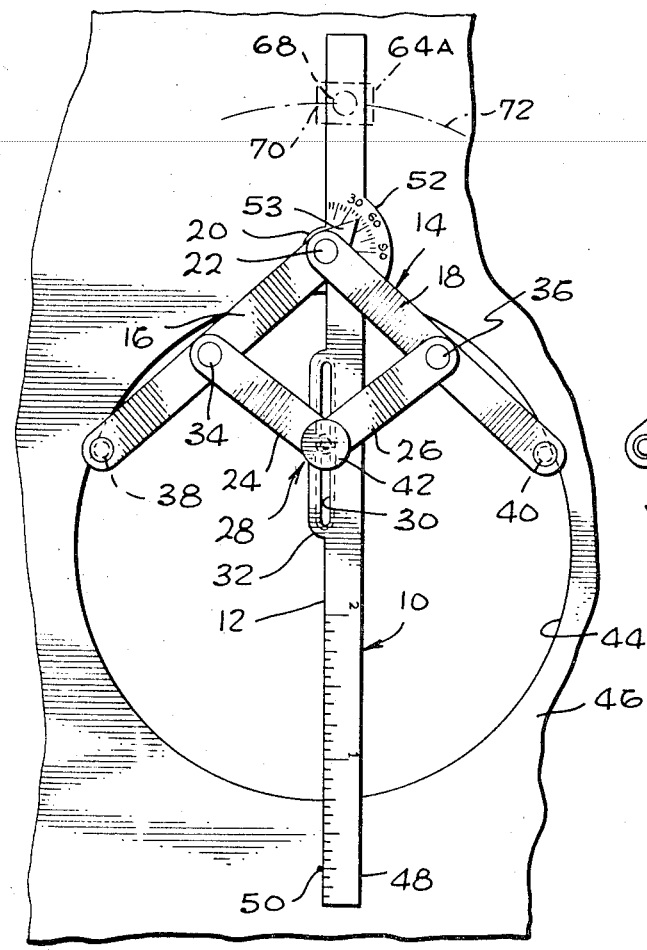
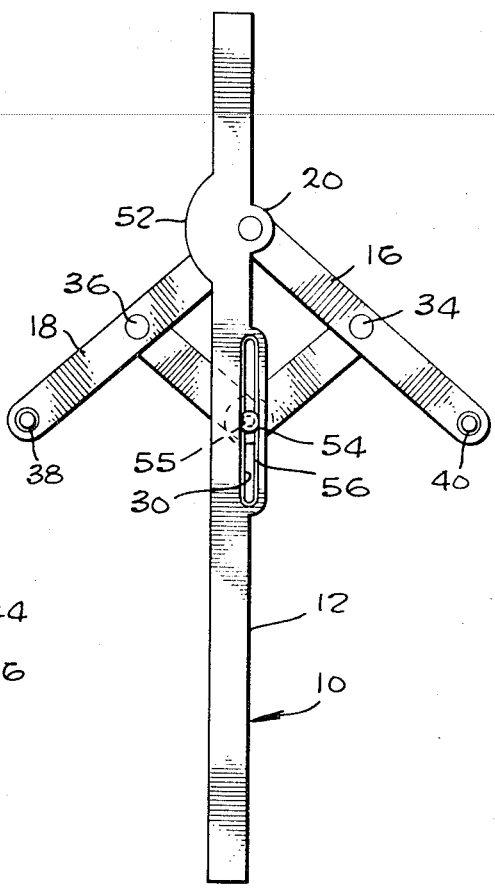
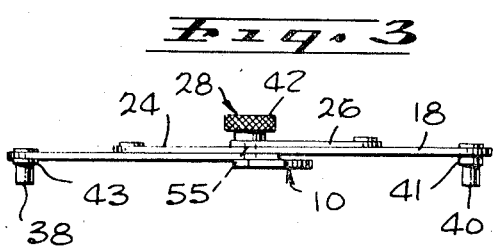
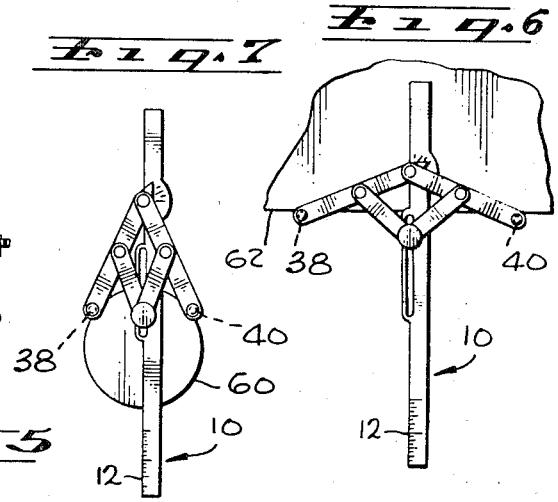
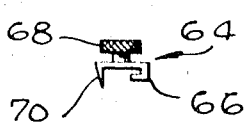
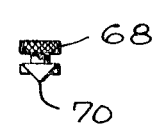
INVENTOR.
ROBERT G. GREEN
BY
ATTORNEYS United States Patent Office 3,562,919
Patented Feb. 16, 1971

3,562,919
LAYOUT TOOL
Robert G. Green, Lancaster, Calif., assignor to the United States of America as represented by the Administrator of the National Aeronautics and Space Administration
Filed Aug. 29, 1968, Ser. No. 756,266
Int. Cl. B23b 49/02
U.S. Cl. 33—189         5 Claims

ABSTRACT OF THE DISCLOSURE

A compact layout tool for machine shop use to locate a point in precise relationship to a straight or arcuate reference edge. The tool comprises a straight edge blade, and a parallelogram structure mounted on the blade. Two of the opposite corners of the parallelogram structure are held on the straight edge, one pivotally joined thereto and the other constrained to movement therealong. The other two corners lie on opposite sides of the straight edge, and a pair of pins is mounted outwardly of these corners. When the pins engage a reference edge, the straight edge blade extends perpendicular to the reference edge. The parallelogram structure can be opened for large workpieces, and can be collapsed for carrying the tool in a shirt pocket.

ORIGIN OF INVENTION

The invention described herein was made by an employee of the United States Government and may be manufactured and used by or for the Government for Governmental purposes without the payment of any royalties thereon or therefor.

BACKGROUND OF THE INVENTION

(1) Field of the invention

This invention relates to layout tools.

(2) Description of the prior art

Metal working often involves the layout of points on a workpiece in moderately accurate relationship to other points. For example, instrument panels are often formed with large holes through which a dial is inserted. Mounting holes must be drilled at predetermined distances from such a dial hole, to receive screws that hold the dial instrument in place. A center head instrument is sometimes used for such layout work. It comprises a straight edge blade, and a V-shaped head centered on the blade edge. The ends of the V are held against the perimeter of the dial hole, and the straight edge then lies along a radius of the dial hole. Distances measured along the straight edge are distances measured precisely from the center of the dial hole.

When V-shaped center heads are used, a set of several sizes usually must be provided for general shop use. This is because a small center head is inaccurate for large circles, while a large center head cannot fit into small circles. A set of heads has the disadvantage of large bulk and cost. In some types of work, the center heads must be used constantly, and it would be convenient if they could be carried in a shirt pocket. However, the fixed V configuration makes even one center head bulky and therefore inconvenient to carry.

OBJECTS AND SUMMARY OF THE INVENTION

One object of the present invention is to provide a layout tool which provides accurate layout for a wide range of workpiece sizes.

Another object is to provide a compact and economical multipurpose layout tool.

In accordance with the present invention, a layout tool is provided which comprises a straight edge blade, and a parallelogram structure with equal sides. The parallelogram sides are formed by four elongated members which are pivotally joined to form four corners. One corner is pivotally joined to the straight edge blade, while the opposite corner is constrained to movement along the straight edge. The other two corners lie on opposite sides of the straight edge blade. Pins are fastened to two of the elongated members at points on opposite sides of the straight edge.

The tool can be used to establish a line which is perpendicular to a straight reference edge. This is accomplished by moving the pins against the reference edge. The straight edge of the blade is then perpendicular to the reference edge. In order to establish the straight edge blade along a line which is radial to a circular hole, the pins are moved against the perimeter of the hole. If the hole is small, the pins must be moved close together, so the parallelogram is almost completely collapsed. If the hole is large, or the reference edge is straight, the pins are moved far apart to increase accuracy. The tool is generally collapsed when it is to be carried in the pocket.

In one embodiment of the invention, the straight edge is marked as a ruler, to enable distance measurements to be made. Also, the portion of the straight edge blade around the point where two parallelogram arms are pivoted on the blade is marked in degrees to indicate the angle of the arms. With these distance and angle markings, the tool serves as a general purpose instrument, and can be used as a ruler or protractor. In still another embodiment of the invention, a scriber is provided which can be mounted on the straight edge. The scriber can be used to draw a line which is radial or concentric with a circular reference edge, or which is perpendicular or parallel to a straight reference edge.

The novel features of the invention are set forth with particularity in the appended claims. The invention will best be understood from the following description when read in conjunction with the accompanying drawings.

BRIEF DESCRIPTION OF THE DRAWINGS

FIG. 1 is a plan view of a layout tool, showing it used on a workpiece with a circular aperture;
FIG. 2 is a bottom elevation view of the tool of FIG. 1;
FIG. 3 is an end elevation view of the tool of FIG. 1;
FIG. 4 is an end elevation view of a scriber attachment, for use on the tool of FIG. 1;
FIG. 5 is a side elevation view of the scriber of FIG. 4;
FIG. 6 is a plan view of the tool of FIG. 1, showing its use against a straight reference edge; and
FIG. 7 is a plan view of the tool of FIG. 1, showing its use in finding the center of a solid cylinder.

DESCRIPTION OF THE PREFERRED EMBODIMENTS

FIGS. 1, 2, and 3 illustrate a layout tool in an approximately half-opened configuration. The tool comprises a blade 10 defining a straight edge 12 and a parallelogram structure 14 mounted thereon. The parallelogram structure comprises two arms 16 and 18 having inner ends which are pivotally joined to each other and to a protuberance 20 on the blade at a pivot 22. The parallelogram structure also includes a pair of links 24 and 26 having inner ends pivotally joined to each other and to a slide bearing assembly 28. The slide bearing assembly is constrained to movement along a slot 30 formed in a slot bearing portion 32 of the blade. The outer ends of the links are pivotally joined at 34 and 36 to the arms 16 and 18 of the parallelogram structure.

The pivot point 22 where the inner ends of the arms are joined to form one parallelogram corner, and the slot 30 which holds the slide bearing assembly that defines the location of the opposite parallelogram corner, are both in line, or aligned with, the straight edge 12 of the blade. The pivot points 34 and 36 are located on outer end portions of the arms, at positions which result in the sides of the parallelogram structure being equal, so that the parallelogram is a rhombus. The sides of the parallelogram are measured between the pairs of adjacent pivot points 34 and 22, 22 and 36, 36 and 28, and 28 and 34. Two pins 38 and 40 are mounted along the outer end portions of the arms 16 and 18 at the outer ends thereof. Because of the equal sides of the parallelogram, the angle between the straight edge 12 and either arm 16 or 18 is equal for any configuration of the parallelogram structure. Also, a line joining the pins 38 and 40 is perpendicular to the straight edge 12 for any configuration of the parallelogram.

The slide bearing assembly 28 includes a locking screw 42 which can be turned to lock the position of the bearing assembly at any desired place along the slot 30. With the locking screw 42 thus engaged, the configuration of the parallelogram structure 14 is fixed. The layout tool can then be used in a variety of applications. One application, shown in FIG. 1, is the establishment of the straight edge 12 along a radius of an aperture 44 formed in a workpiece 46. This is accomplished by positioning the tool with the pins 38 and 40 placed against the perimeter of the aperture. This application of the layout tool is commonly encountered in the production of custom instrument panels, wherein the workpiece 46 is a plate in which the aperture has been formed to receive an instrument dial. Mounting holes for receiving screws that hold the instrument in place may have to be located at predetermined distances from the edge of the aperture 44, as measured along a line which passes through the center of the aperture 44. This is accomplished by measuring a distance along the straight edge 12 from the edge of the aperture 44.

One end 48 of the blade has ruler markings thereon. This facilitates the measurement of the distance between a point such as that shown at 50 and the edge of the aperture 44, and in a variety of other applications. A protractor portion 52 is formed in the blade around the pivot point 22. An extension of the arm 16 is formed as a pointer 53 which lies over the protractor portion. The protractor portion 52 carries angle markings for indicating the angle between the straight edge 12 and the arm 16 (either edge of the arm 16 can be used). This enables use of the instrument for measuring angles, which is often required in layout work.

The blade 10 and each of the two arms and two links may be formed from a sheet of steel or other stiff material. The pivots at 22, 34, and 36 are rivets inserted through holes formed in the links or arms. The bottom face of the arms 16 and 18 and the blade protuberance 20 have countersunk holes at pivots 34, 36 and 22 respectively. This allows the rivets to be formed flush against the bottom surface to prevent "catching" of the rivets on workpieces. The pins 38 and 40 are formed so that their ends lie at the same distance below the blade 10. Since the arm 18 lies at a slightly higher level than the other arm 16, the pin 40 has a base portion 41 which is thicker than the base portion 43 of the other pin 38.

The locking assembly 28 comprises a thin bearing pin 54 which is enaged in a cutout border area 56 formed in the bottom surface of the blade around the slot. As a result, the bearing pin 54 does not protrude below the bottom surface of the blade. A threaded rod, indicated at 55, is fixed to the bearing pin 54 and extends through holes in the links, so that its lower portion confines the corner of the parallelogram structure to movement along the slot. The upper portion at the rod 55 is pivotally engaged with holes in the links to provide pivotal connection, and is threadably engaged with the locking screw 42. Tightening of the locking screw 42 squeezes the links and blade between the locking screw and bearing pin to fix the configuration of the tool.

The layout tool is readily adaptable for a variety of object sizes and a variety of applications. FIG. 7 shows the tool being used to find the center of a relatively small cylinder 60. In order to find the center of the small cylinder, the parallelogram structure is collapsed so that the pins 38 and 40 are closer together than the diameter of the cylinder. The cylinder center can be marked by scribing a line along the straight edge 12 and then rotating the layout tool approximately 90° and scribing another line. The intersection of the two lines is at the center of the cylinder. The tool is useful for very small circular apertures and cylinders, since the pins can be moved very close together.

In the use of the layout tool for a very large aperture, or for a straight edge, the parallelogram structure should be extended. Extending the parallelgram structure so that the pins 38 and 40 are far apart increases the accuracy of location of the straight edge 12. FIG. 6 illustrates the use of the tool against a straight edge 62 of a workpiece, wherein the pins 38 and 40 are moved far apart.

An impotrant feature of the layout tool is that it can be collapsed to a compact configuration. This is accomplished by collapsing the tool toward the configuration of FIG. 7, and even further, so that the pins 38 and 40 are as close together as possible. The locking screw 42 may then be tightened to prevent accidental opening. The tool is then compact and, in moderate sizes wherein the blade is approximately six inches long, the tool may be readily carried in a shirt pocket. The tool is readily available for establishing perpendiculars, measuring angles and distances, and in other applications.

The layout tool can be constructed in a variety of configurations. For example, the arms and links can be made the same length, and the pins can form a part of the joints at 34 and 36. However, this limits the accuracy of the tool for large workpieces. Generally, it is preferable to place the pins approximately so far out as the joints 34 and 36 between the arms and links, or even further as in the embodiment shown in the figures. It should be noted that a structure other than a precise geometrical parallelogram can be used, so long as two adjacent sides such as 24 and 26 are equal and the other two adjacent sides which are part of arms 16 and 18 are equal. Such a four sided figure, which somewhat resembles a parallelogram, may be referred to as parallelogram-type structure.

FIGS. 4 and 5 illustrate a scriber attachment which is useful in the layout tool of the invention. The scriber attachment 64 comprises a body 66 with a slot-like aperture adapted to receive the blade 10 of the layout tool. A tightening screw 68 serves to fix the position of the scriber attachment along the straight edge blade. A point portion 70 of the body has a sharp end which can scribe a line on metal. The scriber attachment is utilized by placing it on one end of the blade, so that it has a position such as that shown at 64A in FIG. 1. With the tightening screw 68 tightened to hold the scriber attachment firmly in place on the blade, the pointer portion 70 can be used to scribe a line such as that shown at 72 in FIG. 1. The line 72 is concentric to the aperture 44.

The scriber attachment 64 can be used in another manner, by loosening the tighting screw 68 and keeping the layout tool stationary. If the scriber attachment at 64A is moved along the blade 10, it scribes a line along the straight edge 12, which is radial to the aperture 44. The scriber attachment can be used in a similar manner when the layout tool is positioned against a straight edge as in FIG. 6 or is positioned against a cylinder as in FIG. 7.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:
1. A layout tool comprising:
a blade defining a straight edge;
first and second arm members, each having an inner end and an outer end portion;
means pivotally joining said inner ends of said arm members to each other and to said blade at a point in line with said straight edge;
first and second link members, each having an inner end and an outer end portion;
joint means constrained to movement along a line which is aligned with said straight edge, said joint means pivotally joining said inner ends of said link members to each other restraining them to positions along said line;
means pivotally joining said outer end portions of said first and second arm members to said outer end portions of said first and second link members, respectively, at positions which define a four-sided figure with a first pair of adjacent sides of equal length and a second pair of adjacent sides of equal length, between points of pivotal connection of said arm and link members to each other;
a substantially cylindrical pin mounted at the outer end portions of two of said members whose outer end portions are spaced from each other when said four-sided figure is in an open configuration; and
means for retaining said members in a fixed relative orientation.

2. The layout tool described in claim 1 including:
protractor means disposed about said means pivotally joining said inner ends of said arm members; and
means disposed on one of said arm members in indicating relationship with said protractor means, for indicating the angle of orientation of said arm members.

3. The layout tool described in claim 1 including:
a scriber;
means for mounting said scriber on said blade, for movement parallel to said straight edge; and
means for releasably fixing the position of said scribed along said blade, whereby to enable the scribing of lines both perpendicular and parallel to a reference edge.

4. A layout tool comprising:
a blade having a portion with a straight edge;
a parallelogram-type structure having four elongated members, and means for coupling said members to form four pivotally joined corners;
means for clamping said parallelogram-type structure in a fixed configuration and releasing it therefrom;
means for holding said parallelogram-type structure to said blade with opposite first and second corners of said parrallelogram-type structure in line with said straight edge of said blade;
scriber means; and
means for fixing said scriber means to said blade, whereby to enable the scribing of a line parallel to a reference edge engaged by said pin means.

5. A layout tool comprising:
a blade having a portion with a straight edge;
a parallelogram-type structure having four elongated members, and means for coupling said members to form four pivotally joined corners;
means for clamping said parallelogram-type structure in a fixed configuration and releasing it therefrom; and
means for holding said parallelogram-type structure to said blade with a first corner thereof pivotally joined to said blade at a point in line with said straight edge of said blade and a second corner in line with said straight edge; and
angle markings disposed on said blade about said first corner, for indicating the angle between one of said elongated members and said straight edge.

References Cited

UNITED STATES PATENTS

| 539,688 | 5/1895 | Kolb | 33—191 |
| 608,183 | 8/1898 | Davis | 33—191 |
| 650,799 | 5/1900 | Sanders | 33—27(F) |
| 3,052,033 | 9/1962 | Studt | 33—27(C) |

FOREIGN PATENTS

| 159,761 | 4/1905 | Germany | 33—189 |

OTHER REFERENCES

"American Machinist," Apr. 22, 1948, p. 95.

WILLIAM D. MARTIN, JR., Primary Examiner

U.S. Cl. X.R.

33—27, 42, 75